United States Patent Office 3,287,318
Patented Nov. 22, 1966

3,287,318
SUBSTANTIALLY NEUTRAL ELECTROPHILIC SALTS AS CURING CATALYST FOR AMIDE-ALDEHYDE RESINS
Stewart W. Gloyer and Harold G. Bittle, Gibsonia, and Charles V. Semroc, Natrona Heights, Pa., assignors to Pittsburgh Plate Glass Company, Pittsburgh, Pa,. a corporation of Pennsylvania
No Drawing. Filed Aug. 10, 1961, Ser. No. 130,465
12 Claims. (Cl. 260—72)

This invention relates to the curing of thermosetting interpolymer resin coatings and it has particular relation to the curing of aldehyde-substituted amide interpolymers, such as those which are obtained by reacting an aldehyde with an interpolymer, one component of which is an unsaturated amide.

It has heretofore been disclosed to prepare valuable resins by interpolymerizing an unsaturated amide with one or more added monomers and then reacting the resultant interpolymer with an aldehyde, preferably in the presence of an alcohol, such as butanol. Such resins are disclosed in certain copending applications, such as Serial No. 749,583, dated July 21, 1958, now U.S. Patent No. 3,037,963, and United States Patents Nos. 2,940,943, 2,940,944 and 2,940,945, all issued June 14, 1960. In many instances, the aldehyde-modified interpolymer resin is further modified with added resins, such as epoxy resins, alkyd resins, polymers of vinyl halides, nitrocellulose and others. These modifying resins or plastics may in most instances be incorporated by merely blending with the liquid aldehyde-modified amide interpolymer.

The aldehyde-modified amide interpolymer is ordinarily obtained as a resin soluble in a solvent media, for example, alcohols and aromatic hydrocarbon solvents. The resultant solutions at proper dilution can be spread as films upon surfaces and cured for 20 to 30 minutes at temperatures of about 350° F. to 400° F., or at about 550° F. for 60 to 90 seconds to provide hard, chemically resistant and durable films.

The foregoing temperatures of cure are sometimes so high as to be difficult to attain and maintain in the apparatus employed by many users. If the temperature is lowered, one or more of such characteristics as hardness, solvent resistance, stain resistance, detergent resistance, etc., are likely to be impaired. Accordingly, in the curing operation, it is sometimes necessary to add a curing catalyst. The latter usually is a strong mineral acid and therefore is a proton donor and being represented by phosphoric acid. These have the effect of inducing cure of films to hard, tough, thermoset, chemically resistant, stain resistant, detergent resistant state at a lower temperature. However, even though these catalysts do permit the curing of the resin at more moderate temperatures, their use does not permit attainment and maintenance of the full gloss which the resin or a pigmented coating composition thereof is capable of producing, and often the resistance to detergents and other materials is not as good as may be desired.

This invention is based upon the discovery that certain salts of the Lewis acid type are useful catalysts for the curing of films of aldehyde-modified amide interpolymer resins. Lewis acids are described in the text, General Chemistry, Second Edition, page 457, by Pauling, W. H. Freeman and Company, San Francisco, California, publishers. The salts used herein, at least initially, are substantially neutral, but are electrophilic and are not proton donors. Resin mixtures catalyzed therewith are of unusual stability and the cured films therefrom are of enhanced gloss and retain the desirable properties of uncatalyzed materials cured at higher temperatures.

Compounds contemplated as catalysts of curing of the interpolymer resins comprise substantially neutral, electrophilic salts of such metals as zinc, aluminum, iron, tin, selenium and others, the preferred metal being zinc. The preferred salts of these metals are the halides, such as the chlorides, bromides or iodides. However, the salts of these metals and other acids, such as phosphoric acid, sulfuric acid, nitric acid, or strong organic acids such as maleic acid or chloroacetic acid, may also be utilized.

Appropriate examples of salts are represented by:

| | |
|---|---|
| Aluminum chloride | Zinc chloroacetate |
| Aluminum sulfate | Zinc maleate |
| Ferric chloride | Zinc chloride |
| Ferric sulfate | Zinc sulfate |
| Stannous chloride | Zinc nitrate |
| Stannous sulfate | Zinc phosphate | and the like. The salts are neutral but electrophilic.

The salts preferably are added to the aldehyde-modified amide interpolymer resins in amounts in a range of about ½ percent to about 5 percent based upon the total resin solids.

It is not intended to limit the invention to any specific mode of operation of the catalyst; however, it is postulated that in the curing of the films of the aldehyde-modified amide interpolymer resins, while the foregoing salts do not contain protons, they may actually tend at least partially to decompose or to react at curing temperatures to provide corresponding free acids, such as hydrochloric acid, sulfuric acid, nitric acid, or ions thereof, which do contain protons. These catalysts, therefore, can be incorporated into the resin vehicles for substantial periods of time before the materials are to be used in coating operations, and the materials during the storage stage are of relatively high stability even at temperatures above normal room temperature, e.g., at 100° F. to 110° F.

The salts may be used in curing to final hard and thermoset state, films of various aldehyde-substituted amide interpolymer resins. Many such resins are disclosed in the applications and patents aforesaid.

In the preparation of the resins, an amide containing a terminal ethylenic group preferably is subjected to interpolymerization in a first stage with at least one added monomer. Amides containing terminal ethylenic groups useful in this reaction comprise such amides as acrylamide, methacrylamide, itaconic diamide and the like. These are the preferred amide monomers; however, others such as maleuric acid or its esters having the structure:

wherein R is alkyl (methyl, ethyl, propyl, butyl, etc.), may also be employed. N-carbamyl maleimide of the structure:

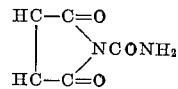

may also be used.

Depending upon the choice of added monomers utilized in preparing the polymers, a wide range of polymers from soft, flexible materials to very hard materials can be readily obtained. These added monomers all include the terminal $CH_2=C<$ group and are represented by:

(1) Monoolefinic hydrocarbons, that is, monomers containing only atoms of hydrogen and carbon, such as styrene, vinyl toluene, alpha-methyl styrene, alpha-ethyl styrene, alpha-butyl styrene, and the like;

(2) Halogenated monoolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene-1, 2-chlorobutene-1, 2-chloropentene-1, 2-chlorohexene-1, 2-chloroheptene-1, 2-bromobutene-1, 2-bromoheptene-1, 2-fluorohexene-1, 2-fluorobutene-1, 2-iodopropene-1, 2-iodopentene-1, 4-bromoheptene-1, 4-chloroheptene-1, 4-fluoroheptene-1, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1 - diiodoethylene, 1,1,2,2-tetrafluoroethylene, 1,1,2,2 - tetrachloroethylene, 1-chloro-2,2,2-trifluoroethylene, and the like;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxy benzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alphachloroacetate, and isopropenyl alphabromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, and vinyl alphabromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl choroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohol, 1-butene-4-ol, 2-methyl-butene-ol-4, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate, and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like;

(6) Monomeric dienes, such as butadiene-1,3, 2-methyl butadiene-1,3, 2-chlorobutadiene-1,3, 2-bromo-butadiene-1,3, and the like; and (7) Monomeric ketones, such as isopropenyl methyl ketone, vinyl methyl ketone, and the like.

In general, it is preferred that the added monomer utilized contain a single $CH_2=C<$ group in terminal position, which group is activated by a negative substituent, and an especially preferred group of monomers includes ethyl acrylate, methyl methacrylate, butyl acrylate, ethylhexyl acrylate, styrene, vinyl toluene, monomethyl styrene, and acrylonitrile.

The techniques disclosed in the aforementioned applications and patents may be pursued in the preparation of the aldehyde-modified interpolymer resins in the films of which the neutral, electrophilic salts of this application are useful as curing catalysts.

As stated hereinabove, acrylamide or other polymerizable amide is polymerized with one or more ethylenically unsaturated monomeric compounds, and the resulting interpolymer reacted with an aldehyde to form one component of the coating compositions of this invention. The exact mechanism whereby the acrylamide interpolymers are obtained is not definitely known, but is believed to begin by the formation initially of a relatively short chain, soluble interpolymer having an approximate structure as follows, acrylamide being utilized for illustrative purposes:

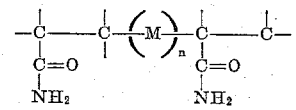

wherein M represents a unit of a monomer polymerizable with acrylamide, and $n$ represents a whole number greater than 1. For example, if styrene were utilized as the second monomer, M would represent the unit:

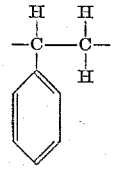

The short chain interpolymer then reacts with an aldehyde as represented by formaldehyde, to give the structure:

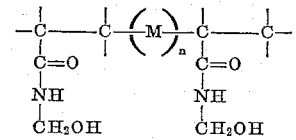

wherein M and $n$ have the significance set forth hereinabove.

In the event the formaldehyde is utilized in the form of a solution in butanol or other alkanol, etherification may take place so that at least some of the methylol groups in the above structure will be converted to groups of the structure:

—$CH_2O$ alkyl the alkyl group being derived from the alkanol utilized. The amount of etherification taking place depends in large measure upon the pH of the reaction medium, with acid conditions favoring etherification.

It will be appreciated that the neutral salt catalysts as herein disclosed may also be incorporated with interpolymers of methacrylamide and another monomer which has not been reacted with formaldehyde. Sometimes acrylamide may be reacted with formaldehyde or a compound which generates formaldehyde, e.g., paraformaldehyde in the presence of an alkanol, thus forming an alkoxyacrylamide, which is then interpolymerized with one or more monomers. The product can be cured when baked in the presence of a neutral, electrophilic salt. Also, the interpolymer may be reacted with formaldehyde and the stage of reacting the resultant methylol substituted amide groups with an alcohol to provide ether groups may be omitted. The product may be catalyzed with zinc chloride, spread as a film and baked to effect curing.

Resinous materials, in films of which the neutral salt catalysts are especially useful, may be prepared from aldehyde-substituted amide interpolymers in which at least 50 percent, and preferably 90 percent to 100 percent of the amido groups have a hydrogen atom replaced by groups of the structure —$ROR_1$. In the latter group, R is a lower aliphatic hydrocarbon radical having its connecting valences on a single carbon atom, and $R_1$ is an alkyl or aralkyl radical. The presence of the —$ROR_1$ groups in the interpolymer chain has a strong effect upon the stability of the polymer, and makes it possible to prepare coating compositions and similar materials which possess excellent shelf-like. Moreover, the polymers of this type possess outstanding physical properties including toughness, mar resistance and alkali reistance, when properly cured.

It has been found that in those instances where a two-component interpolymer prepared from an unsaturated polymerizable amide and a single monomer polymerizable therewith is not completely suitable for further reaction in a second stage with an aldehyde, useful modification of the interpolymer can usually be obtained by including a third monomer, such as one selected from the group of added monomers, in the interpolymerizable mixture. For example, one useful ternary interpolymer is prepared from acrylamide, ethyl acrylate and styrene. Methyl methacrylate generally tends to improve the hardness of two-component interpolymers. A small quantity of an acid monomer, such as acrylic acid, methacrylic acid, crotonic acid, maleic acid and fumaric acid, contributes greatly to the adhesion properties of a resin prepared according to the method of this invention.

Interpolymers of the unsaturated polymerizable amide with one or more polymerizable monomers are most readily prepared by carrying out the polymerization in a solvent in which the unsaturated polymerizable amide and the other monomer/s are soluble at reaction temperature and under reflux temperatures. Butanol has proven to be a satisfactory solvent in most cases. Isopropyl alcohol, butyl Cellosolve, and mixtures of butanol or other lower alkanol with water can also be used advantageously as solvents. The presence of lower alcohols or water has been found to moderate the speed of reaction by lowering the reflux temperature, but care must be exercised when water is present in the system as gummy precipitates may result, especially with the higher water levels. Butyl or ethyl acetate, or other ester solvents, and hydrocarbons such as xylene or mixtures of solvents and the like may also be employed. Mixtures of alcohols and aromatic hydrocarbons are especially useful for this purpose.

In carrying out the polymerization reaction, a peroxygen type catalyst of addendum reaction is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that benzoyl peroxide and cumene hydroperoxide are two of the most economical of the above peroxygen compounds and singly, or in mixtures, are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as alpha-alpha-azo-diisobutyronitrile or p-methoxyphenyl dizao-thio-(2-naphthyl)ether, may also be used as polymerization catalysts in the preparation of the unsaturated polymerizable amide interpolymers. Redox catalyst systems can also be employed.

The quantity of catalyst employed in forming the interpolymer can be varied considerably; however, in most instances, it is desirable to utilize from about 0.1 percent to 2.0 percent by weight of the monomeric components. If high viscosities are desired, a low initial level of catalyst followed by the necessary additions to get 100 percent conversion is preferably employed. For low viscosity interpolymers, the bulk of the catalyst is added initially and later additions used only to secure desired conversions. Larger amounts of catalyst added initially give lower viscosities.

Since it is often desirable that the interpolymers of the unsaturated polymerizable amide with other ethylenically unsaturated monomers be relatively low in molecular weight so that they can easily be dissolved in solvents, such as butanol, toluol, xylol, etc., at high solids to attain low viscosities, a chain modifying agent or chain terminator may be added to facilitate maintenance of low viscosity. However, it is not an essential component and may be eliminated from the mixture without departure from the scope of the invention. The use of a lower alkanol, such as butanol or a mixture of butanol and water, as a solvent, together with high catalysts levels, helps considerably in chain length control. Aromatic hydrocarbons in the mixture also help to control chain lengths, but in most instances, it is preferred to add controlled amounts of chain modifying materials. These are represented by the mercaptans, such as dodecyl mercaptan, teritary dodecyl mercaptan, octyl mercaptan, hexyl mercaptan, and the like, which are conventionally used for this purpose. However, other chain modifying agents, such as cyclopentadiene, allyl acetate, allyl carbamate, alpha-methyl styrene dimers, and alpha-methyl styrene itself, and unsaturated fatty acids or esters, all can be used to secure low molecular weights.

Another method for preparing the unsaturated polymerizable amide interpolymers involves utilization of "block" or "graft" techniques. Conventional polymerization procedures ordinarily result in a random distribution of the components in the interpolymers. By "block" or "graft" methods, the components can be introduced into the composition in a regular sequence or order, each segment being of a certain length and periodicity. These products can be made such that the unsaturated polymerizable amide portion is in a fixed position in the composition, this approach involving the preparation of segments with reactive end groups or reactive sites along a preformed backbone from which, or to which other segments can be grown or attached. The properties of materials prepared by this relatively new technique are known to be quite different in many instances from interpolymers in which the components are randomly oriented. By the "block" or "graft" method, one can prepare, by choice, materials of different solubility, solvent and flame resistance, adhesion, water solubility, and in fact, almost any desired property can be "tailored" into the interpolymer.

It is preferred that the aldehyde or aldehyde and alkanol be reacted with an interpolymer derived from a mixture containing from about 2 percent to about 50 percent by weight of the unsaturated polymerizable amide, the balance of the reactants being the other ethylenically unsaturated monomer(s). It has been found that interpolymers containing the higher levels of the unsaturated polymerizable amide or those monomers which ordinarily form hard homopolymers, give hard and flexible films and consequently can be used as primary film formers, whereas interpolymers containing lower levels of the unsaturated polymerizable amide with those monomers which ordinarily form soft homopolymers tend to be softer and useful as plasticizers for nitrocellulose and similar materials.

If more than one ethylenically unsaturated monomer is polymerized with the unsaturated polymerizable amide, the proportions of such additional monomers utilized will depend upon the characteristics which such monomers or monomer will impart to the final interpolymer. For example, in some ternary interpolymer systems, it may be desirable to utilize about 20 percent by weight of the unsaturated polymerizable amide, and 40 percent each of two additional monomers, such as styrene or butadiene, or in some instances, such as when acrylic acid is one of the monomers utilized, it is desirable that the interpolymer contain about 20 percent of the unsaturated polymerizable amide, about 78 percent of a second ethylenically unsaturated monomer, and only about 2 percent of acrylic acid. The amount of monomers necessary in any interpolymerization reaction can readily be determined by simple experiment.

The polymerization is best carried out by admixing the unsaturated polymerizable amide and the other monomer or monomers, the catalyst of interpolymerization (usually peroxidic) and chain modifying agent, if any, in the solvent and refluxing the resulting solution for a time sufficient to obtain the desired conversion. Ordinarily, the polymerization time will be from about 1 hour to 16 hours. As indicated hereinabove, it may in some instances be desirable to add only a portion of the catalyst initially, the remainder being added in increments as the polymerization progresses. External cooling of the polymerization mixture, or control of reflux conditions is desirable in carrying out the polymerization because of the very rapid reaction rate. Good agitation is also desirable.

Ordinarily, the monomers and solvent are charged in amounts which would give an interpolymer of a solids content of approximately 50 percent based on 100 percent conversion to polymer. However, in the event that the unsaturated polymerizable amide is present in an amount of about 30 percent to 50 percent by weight of the total monomer charge, the monomers and solvent should be proportioned to give a solids content of about 30 percent or less in order to prevent the formation of a gel, especially upon reaction with formaldehyde. In such cases, a portion of the solvent can be evaporated after polymer formation is complete in order to give any desired solids content.

As indicated hereinabove, the preferred interpolymers of an unsaturated polymerizable amide and added monomer/s prepared according to the method disclosed herein, are readily soluble in inexpensive organic solvents, such as toluene or xylene, but are substantially water insoluble. The electrophilic salts herein disclosed can be incorporated in the solutions to promote hardening of the resins contained therein.

Sometimes the electrophilic salts, such as zinc chloride, can also be added to emulsion types of interpolymers containing an N-alkoxy-acrylamide component along with added monomer in an aqueous medium. These can be prepared by first forming an N-alkoxy-acrylamide by reaction of formaldehyde or a generator of formaldehyde, such as paraformaldehyde, in the presence of an alcohol, such as butanol. The N-alkoxy-acrylamide and an added monomer are then emulsified with water and catalyst, such as ammonium persulfate, and are interpolymerized to provide an emulsion in which zinc chloride is fairly stable.

The soluble resinous materials most useful in the present invention are obtained by reacting the interpolymers prepared according to the methods described above, with an aldehyde and either an alkanol or an aralkanol in such a manner that at least about 50 per cent of the amido groups have a hydrogen atom replaced by —ROR$_1$ groups, wherein each R is an aliphatic hydrocarbon radical, preferably an alkylene radical, having its connecting valences on a single carbon atom, and R$_1$ is an alkyl radical or an aralkyl radical. Formaldehyde, in the form of an alkanol solution thereof, or a formaldehyde yielding substance, such as paraformaldehyde or trioxymethylene, is preferred. However, other monoaldehydes, that is, aldehydes containing a single aldehyde (—CHO) group, and preferably containing only atoms of carbon, hydrogen and oxygen and being represented by acetaldehyde, butyraldehyde, furfural, and the like, can also be used. Aldehydes containing two or more aldehyde groups, such as glyoxal, are unsatisfactory and should not be used inasmuch as they cause premature gel formation when reacted with amide interpolymers.

It is preferred that the alkanol utilized in the reaction be butanol. However, other alkanols, including methanol, ethanol, propanol, isopropanol, pentanol, hexanol, heptanol and octanol, as well as higher alkanols including those containing up to about 12 carbon atoms, can also be employed. Likewise, aralkanols, such as benzyl alcohol, can be utilized with good results. Mixtures of two or more of the alakanols may be used if desired.

It is ordinarily preferred to utilize two equivalents of formaldehyde for each amide group present in the interpolymer. However, this ratio may be raised or lowered considerably if desired. For example, the ratio may be as high as about 3.0 equivalents of formaldehyde for each amide group in the interpolymer, or as low as about 0.3 equivalent of formaldehyde for each amide group in the interpolymer. Some of the formaldehyde utilized may be consumed in a side reaction producing a dialkyl formal.

The reaction of the interpolymer and the aldehyde is preferably carried out in the presence of a mild acid catalyst, such as maleic anhydride. Other acid catalysts, such as oxalic acid, hydrochloric acid, or sulfuric acid, may also be utilized with good results. These catalysts of the second stage reaction are not to be confused with the latent catalysts used in the curing of the final film. However, these latent catalysts could also be used in the second stage reaction if so desired. The quantity of catalyst used in the second stage may be varied widely; however, in general, it is preferred to utilize from about 0.2 per cent to 1.0 per cent by weight of catalyst, based upon the weight of the amide interpolymer which is reacted with the aldehyde, concurrently with or subsequent to the reaction of the amido group and the aldehyde to give —N— alkylol groups, the hydroxyl groups of the —N— alkyl radicals and the alcohol react to split off water and thus to form the groups —ROR$_1$ already defined.

The reaction of the amide interpolymer with the aldehyde and the alkanol can be carried out simply by adding the aldehyde, alkanol and catalyst (if one is utilized) to the polymerization mixture obtained by polymerizing the amide and one or more ethylenically unsaturated monomers, and refluxing the resultant mixture for a period of from 3 to 5 hours, or until a desired viscosity or solids content is obtained. The water of condensation can be removed by azeotropic distillation, as may a portion of the solvent if desired. Preferably, the final heat-hardenable, resinous material will have a solids content of about 20 percent to 70 percent and a Gardner viscosity of about H to Z$_4$ at 50 percent solids content. The inert group in the resin molecule may be represented by the formula:

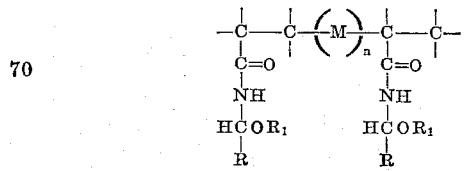

wherein the symbols M and $n$ are of the definitions previously given. R may be a hydrogen atom, furfuryl, saturated lower aliphatic hydrocarbon or the like group, and $R_1$ is a hydrogen atom, a benzyl radical, an alkyl radical containing 1 to about 12 carbon atoms, or the like.

The following examples illustrate the preparation of resinous materials by the reaction of aldehydes with interpolymers of unsaturated polymerizable amides and ethylenically unsaturated monomers, and the use of the resulting resinous materials as film forming compositions. The examples are not intended to limit the invention, however, for there are, of course, numerous possible variations and modifications which involve the broad principles of the invention.

*Example 1*

This example illustrates the use of an unsaturated acid in the acrylamide interpolymerization to provide an internal catalyst which accelerates the cure of the coating composition. The interpolymer was prepared from the following component in the amounts set forth:

In each example, butanol was used as a solvent and cumene hydroperoxide as a catalyst. The solvent could be replaced by other lower alcohols, such as propyl alcohol, ethyl alcohol, methyl alcohol, or the like. The cumene hydroperoxide could be replaced by other peroxidic catalysts of addition reaction.

In the final curing of films of these interpolymers a neutral or substantially neutral salt which is a Lewis acid may be used. This salt is effective only in the final curing stage and is not to be confused with the peroxidic interpolymerization catalyst.

The polymerization was conducted by admixing the monomers in the butanol and adding one-half of the catalyst thereto. The mixture was then refluxed for 2 hours and one-half of the remaining catalyst added. The mixture was again refluxed for 2 hours and the remaining catalyst added. After an additional 2 hours of refluxing, substantially 100 percent conversion to interpolymer was obtained. The pertinent data are set forth in the following table:

TABLE A

| Example | Composition | | | | Preparation | | | Properties | | | |
|---|---|---|---|---|---|---|---|---|---|---|---|
| | Percent Acrylamide | Percent Ethyl Acrylate | Percent Styrene | Percent Vinyl Toluene | Percent Reactive Monomers in Butanol | Percent [1] Tertiary Dodecyl Mercaptan | Percent [1] Catalyst | Percent Solids | Gardner Viscosity | Gardner-Holdt Color | Water [2] Solubility |
| 2 | 15 | 85 | | | 47.5 | 1 | 2 | 45.8 | $Z_2$ | 4-5 | 0.124 |
| 3 | 25 | 75 | | | 30.0 | 2 | 2 | 28.2 | A- | 1-2 | 0.153 |
| 4 | 15 | | | 85 | 47.5 | 1 | 2 | 46.5 | $Z_3-$ | 2-3 | 0.110 |
| 5 | 25 | | | 75 | 30.0 | 2 | 4 | 26.9 | A | 2-3 | 0.095 |
| 6 | 35 | | | 65 | 30.0 | 2 | 4 | 27.2 | B- | 2-3 | 0.187 |
| 7 | 15 | 45 | 40 | | 50.0 | 1 | 2 | 48.5 | U-W | 5-6 | 0.220 |
| 8 | 25 | 40 | 35 | | 50.0 | 2 | 2 | 50.0 | $Z_1-$ | 3-4 | 0.251 |
| 9 | 35 | 35 | 30 | | 30.0 | 2 | 4 | 28.6 | A- | 4-5 | 0.378 |

[1] Based on reactive monomers present.
[2] The solubility test was carried out by drying a sample of the resin to a powder and placing a weighed amount of this resin and a weighed amount of water into a bottle which was then rotated in a water bath at 25° C. for 16 hours. The water was then filtered and a solids analysis carried out to determine how much polymer had dissolved (grams per 100 grams of solution).

| | Parts by weight |
|---|---|
| Styrene | 39 |
| Ethyl acrylate | 44 |
| Acrylamide | 15 |
| Acrylic acid | 2 |
| Cumene hydroperoxide | 1 |
| Tertiary dodecyl mercaptan | 1 |

The above components were admixed and refluxed for 2 hours, after which an additional 0.5 part of cumene hydroperoxide was added and reflux was continued for a further period of 2 hours. A solution comprising 2 moles of formaldehyde (40 percent concentration in butanol) was added together with about 0.33 part of maleic anhydride catalyst. The resulting mixture was refluxed for 3 hours, after which one-half of the butyl alcohol was removed by distillation and replaced by an equal amount of toluene or xylene.

In the above formulation, styrene may be replaced by other monomers containing a $CH_2=C<$ group, or may be eliminated without replacement; ethyl acrylate may be replaced by methyl acrylate or ethyl methacrylate, or by methyl methacrylate and the like; acrylamide may be replaced by methacrylamide or the like; acrylic acid (internal catalyst) by other ethylenically unsaturated acids, or the acid may be eliminated; cumene hydroperoxide may be replaced by other peroxidic catalysts; tertiary dodecyl mercaptan may be replaced by other chain stoppers, or the function may be eliminated.

*Examples 2 to 9*

In accordance with the provisions of these examples, a series of mixtures of aldehyde-modified acrylamide and $CH_2=C<$ monomers were prepared, and the mixtures were interpolymerized by use of a peroxidic catalyst.

The foregoing interpolymers are then reacted by refluxing with a solution of 40 percent formaldehyde in butanol, the amount of formaldehyde being 2 moles for every mole of acrylamide. Usually about 2 to 4 hours of refluxing is sufficient.

The resultant solutions may be used directly in the formation of films, or a portion of the excess butanol may be distilled and a like amount of an aromatic solvent, such as toluene, may be added. If desired, the proportion of added solvent may be varied in order to increase or decrease the viscosity as may be required for specific applications.

A neutral salt, such as zinc chloride, as herein described, is added to the solution to catalyze the curing of resin contained therein.

The resultant resin vehicles, with or without added modifiers, such as vinyl resins, epoxy resins, nitrocellulose, can be dissolved in solvents to obtain desired viscosity. They can be used in clear state, but most often it is desirable to mix them with pigments, such as titanium dioxide or any other pigments having desired color or other properties. The unpigmented vehicles may also be employed in the formulation of clear films. The vehicles herein illustrated, when appropriately incorporated with a neutral salt of the type herein disclosed as catalysts, e.g., zinc chloride, in an amount of about ½ percent to about 5 percent by weight based upon total resin solids, can be applied as films to sheet metal, such as steel, iron or aluminum, or wood, stone, brick, plastics, or other materials, and cured in accordance with the provisions of the present invention to provide films of a high degree of hardness, solvent resistance, stain resistance, and high gloss.

In order to form films from the resin vehicles disclosed in the foregoing Examples 1 through 9, the resin is diluted with a suitable solvent, such as an aromatic solvent represented by toluene or xylene, to obtain desired viscosity and solids content. Usually, the resin is diluted to a solids content of about 50 percent by weight based upon the mixture. The resin may also be modified by added resins or plastics, including epoxy resins resulting from the well-known reaction of an epihalohydrin and a phenol containing a plurality of hydroxyls and being represented by the reaction product of epichlorohydrin and 2,2'-bis-(4-hydroxyphenyl)propane. Other modifying resins and plastics comprise the polymers and interpolymers of vinyl acetate and vinyl chloride, nitrocellulose, alkyd resins which are mixed esters of a polyol (e.g., glycerol), phthalic anhydride and a higher fatty acid of glyceride, or even an oil free alkyd, and the like. The following is illustrative of a specific resin composition which may be used in the preparation of coating films and in which the neutral salt catalysts of this invention can be used to advantage.

Example I

In this example, a resin suitable for use as a vehicle such as that disclosed in Example 1 is employed. This resin preferably is diluted to a concentration of about 50 percent of total solids. The resin may also be modified by the incorporation of about 10 percent upon vehicular solids content of epoxy resin (Epon 1001, having an epoxy value of about 450 to 525). This solution is herein designated as "resin solution." In the formulation of a pigmented coating composition, the foregoing material is mixed with titanium dioxide to provide a pigment paste of the composition:

| | Parts by weight |
|---|---|
| Titanium dioxide | 155.0 |
| Resin solution | 77.7 |
| Xylene | 23.3 |

These several ingredients are ground together in a well-known manner to form a smooth and uniform paste. To this paste are added 256 parts by weight of a 50 percent solution of the resin of Example 1. The paste and the solution of added vehicle may readily be mixed by milling or agitation to provide a coating composition to which a Lewis acid catalyst, such as zinc chloride, can be added either before or after storage. For example, when about 1 percent by weight based upon the total mixture of zinc chloride is added, the coating composition has a shelf-life of at least several weeks. Addition of the catalyst immediately before use of the material is also feasible. When the material is to be used, the composition with the catalyst (zinc chloride) contained therein is applied by appropriate techniques, such as by spraying, flow coating, roller coating or brushing, to the surface to be coated, e.g., a surface of steel or aluminum. If desired, the surface may be subjected to preliminary preparation, as for example, they may be phosphated as with iron phosphate (Bonderite 1000) or zinc phosphate, or other appropriate technique. Direct application of the materials to the surface is also possible. After the films have been spread, they are subjected to curing, as by baking at a temperature of about 260° F. to about 300° F. or 325° F. for a period of about 10 minutes to about 2 hours, and preferably for about 30 minutes.

In a specific example, pigmented material of the foregoing composition is applied to provide a cured film about 1.1 to 1.3 mils thick upon a surface of a sheet steel test piece having Bonderite 1000 surface preparation. It is air dried for 15 to 25 minutes and is cured to a hard, thermoset state by baking in an oven at 300° F. for a period of 30 minutes.

A similar test piece constituting a control is made up in the same way, except for the omission of the zinc chloride. This panel is also baked for 30 minutes but at a higher temperature; namely, 350° F.

A second control sample is made up in which 1 percent based upon the resin, of phosphoric acid is added as a catalyst. This sample is baked at 300° F. for 30 minutes. The several test samples, after curing, are tested for Sward hardness, pencil hardness and gloss before and after aging.

The pencil hardness is the highest hardness of the pencil in the scale between 4B and 5H which will mark without digging into the film and which itself does not crumble when pressed hard against the film. Gloss is determined on a Gardner 60° gloss meter against a standard black gloss plate setting of 94. The results of the test are as follows:

| Catalyst | 30 Minute Cure, ° F. | Pencil Hardness | Initial Gloss | Aged Gloss (1 month at 105° F.) |
|---|---|---|---|---|
| None | 350 | 3H | 86 | 86 |
| Do | 300 | HB | 86 | 86 |
| 1 percent ZnCl$_2$ | 300 | 3H | 87 | 84 |
| 1 percent H$_3$PO$_4$ | 300 | 4H | 78 | 61 |

It will be observed that the film which is catalyzed with zinc chloride and baked at 300° F. for 30 minutes is of substantially the same pencil hardness and gloss as the corresponding values of the films containing no zinc chloride, but being baked at 350° F. for 30 minutes. The latter temperature is often above the range of commercial apparatus. Therefore, the curing characteristics of the resins containing zinc chloride are distinctly better than those of the samples containing no catalyst. Likewise, it will be observed that the films from the material containing the zinc chloride as a catalyst are of distinctly improved gloss, as compared with the sample catalyzed with phosphoric acid.

Similar test samples were also prepared and subjected to staining tests with mustard, ink and lipstick. In the test, a patch of staining material is applied and allowed to stain 100 hours. The area is washed first with soap and water, and is wiped dry with methyl alcohol. The degree of staining is observed. The data from these tests are tabulated as follows:

| Catalyst | Temperature, ° F. | Mustard | Ink | Lipstick |
|---|---|---|---|---|
| None | 350 | S | N | N |
| Do | 300 | VH | VS | S |
| 1 percent ZnCl$_2$ | 300 | S | N | N |
| 1 percent H$_3$PO$_4$ | 300 | S | N | N |

In the table, S designates slight staining, N indicates non-staining, VH indicates very heavy staining, and VS indicates very slight staining. From the table, it is apparent that the test samples cured at 300° F. for 30 minutes and containing zinc chloride as a catalyst are much better in stain resistance than the corresponding sample containing no catalyst. The samples containing the zinc chloride, when cured at 300° F., are equal in stain resistance with respect to mustard, ink and lipstick to either the control baked at 350° F. but without catlyst, or the control containing phosphoric acid but baked at 300° F.

In a still further test, the resistance of films cured in the presence of 1 percent of zinc chloride are compared as to detergent resistance with films (A) containing no catalyst but cured at 350° F., (B) containing no catalyst but being cured at 300° F., (C) containing 1 percent of phosphoric acid and being cured at 300° F. The test panels are all immersed in an aqueous solution containing 1 percent of sodium chloride and 2 percent of the commercial detergent sold as "All." The immersion bath is maintained at 140° F. for 120 hours. The samples are then removed and are observed for failure through blistering. This is a severe test. The percentage of area of failure through blistering for the several samples are tabulated as follows:

| Cure | | Area of Failure |
|---|---|---|
| Catalyst | Temperature, °F. | |
| None | 350 | 2 percent blistering. |
| Do | 300 | 100 percent blistering. |
| 1 percent ZnCl₂ | 300 | ½ percent blistering. |
| 1 percent H₃PO₄ | 300 | 4 percent blistering. |

It will be observed that in this test the samples containing no catalyst, when cured at 300° F., are subject to complete failure. On the other hand, samples from compositions containing zinc chloride are subject only to very slight failure, failure being materially less than that attained by the films containing phosphoric acid or the films containing no catalyst but being cured at 350° F. The use of the zinc chloride as a catalyst, therefore, results in a surprising improvement in the resistance of the coatings to detergents.

Although specific examples of the invention have been set forth hereinabove, it is not intended that the invention be limited solely thereto, but to include all of the variations and modifications falling within the scope of the appended claims.

We claim:

1. A heat-hardenable, resinous composition comprising:
   (a) from about 0.5 to about 5 percent by weight, based on the total of (a) and (b) herein, of a substantially neutral electrophilic metal salt; and
   (b) from about 99.5 to about 95 percent by weight, based on the total of (a) and (b) herein, of an interpolymer of a polymerizable ethylenically unsaturated carboxylic acid amide with at least one other monomer having a $CH_2=C<$ group, said interpolymer containing from about 2 percent to about 50 percent by weight of said amide and being characterized by having amido hydrogen atoms replaced by the structure:

$$-\underset{\underset{CHOR_1}{|}}{R}$$

where R is a member selected from the class consisting of hydrogen, furyl, and a saturated lower aliphatic hydrocarbon radical, and $R_1$ is a member selected from the class consisting of hydrogen, alkyl, and benzyl radicals containing from about 1 to about 12 carbon atoms.

2. The resinous composition as defined in claim 1 wherein the unsaturated amide is acrylamide and at least about 50 percent of said $R_1$ radicals are lower alkyl radicals containing from about 1 to about 6 carbon atoms.

3. The resinous composition as defined in claim 2 wherein R is a methylene group and $R_1$ is at least 50 percent butyl groups.

4. A heat hardened, substantially water-insoluble, resinous composition comprising a resin formed by curing of an interpolymer of an unsaturated amide selected from the class consisting of acrylamide, methacrylamide, itaconic diamide, maleuric acid, alkyl esters of maleuric acid, and N-carbamyl maleimide, with at least one other monomer having a $CH_2=C<$ group, said interpolymer containing from about 2 percent to about 50 percent by weight of said amide and being characterized by having amido hydrogen atoms replaced by the structure:

$$-\underset{\underset{R}{|}}{CH-OR_1}$$

wherein R is a member selected from the class consisting of hydrogen, furyl and a saturated lower aliphatic hydrocarbon radical, and $R_1$ is a member selected from the class consisting of hydrogen atoms, alkyl radicals and benzyl radicals containing from about 1 to about 12 carbon atoms, with at least about 50 percent of $R_1$ radicals being other than hydrogen atoms, the hardening of the resinous composition having been effected by application of heat and in the presence of a substantially neutral electrophilic metal salt.

5. The composition as defined in claim 1 in which the added monomer is a mixture of ethyl acrylate and styrene.

6. A heat-hardenable, resinous composition comprising:
   (a) from about 0.5 to about 5 percent by weight, based on the total of (a) and (b) herein, of a substantially neutral electrophilic salt of a metal selected from the class consisting of zinc, aluminum, iron, tin and selenium; and
   (b) from about 99.5 to about 95 percent by weight, based on the total of (a) and (b) herein, of an aldehyde-modified interpolymer of an acrylamide and at least one other monomer having a $CH_2=C<$ group, said interpolymer containing from about 2 percent to about 50 percent by weight of said amide and being characterized by having at least about 50 percent of the amido groups having a hydrogen atom replaced by the structure:

$$-\underset{\underset{CHOR_1}{|}}{R}$$

where R is a member selected from the class consisting of hydrogen, furyl, and a saturated lower aliphatic hydrocarbon radical, and $R_1$ is a member selected from the class consisting of hydrogen, alkyl, and benzyl radicals containing from about 1 to about 12 carbon atoms.

7. The composition in accordance with claim 6 in which said electrophilic salt is zinc chloride.

8. The composition of claim 6 in which said electrophilic salt is tin chloride.

9. A method of heat-hardening an ungelled, resinous composition comprising an interpolymer of a polymerizable ethylenically unsaturated carboxylic acid amide with at least one other monomer having a $CH_2=C<$ group, said interpolymer containing from about 2 percent to about 50 percent by weight of said amide and being characterized by having amido hydrogen atoms replaced by the structure:

$$-\underset{\underset{CHOR_1}{|}}{R}$$

where R is a member selected from the class consisting of hydrogen, furyl, and a saturated lower aliphatic hydrocarbon radical, and $R_1$ is a member selected from the class consisting of hydrogen, alkyl, and benzyl radicals containing from about 1 to about 12 carbon atoms, said method comprising mixing said resinous composition with from about 0.5 to about 5 percent by weight of a substantially neutral electrophilic metal salt and heating the mixture to an elevated temperature sufficient to convert the composition to a heat-hardened, thermoset state.

10. The method of heat-hardening an ungelled, resinous composition comprising an aldehyde-modified interpolymer of an acrylamide and at least one other monomer having a $CH_2=C<$ group, said interpolymer containing from about 2 percent to about 50 percent by weight of said amide and being characterized by having at least about 50 percent of the amido groups having a hydrogen atom replaced by the structure:

$$-\underset{\underset{CHOR_1}{|}}{R}$$

where R is a member selected from the class consisting of hydrogen, furyl, and a saturated lower aliphatic hydrocarbon radical, and $R_1$ is a member selected from the class consisting of hydrogen, alkyl, and benzyl radicals containing from about 1 to about 12 carbon atoms, said method comprising mixing said resinous composition with from about 0.5 to about 5 percent by weight of a substantially neutral electrophilic salt of a metal selected from the class consisting of zinc, aluminum, iron, tin and selenium, and heating the mixture to a temperature between about 260° F. and about 325° F.

11. A method of heat hardening an ungelled, water-insoluble, resinous composition comprising an interpolymer of an unsaturated amide selected from the class consisting of acrylamide, methacrylamide, itaconic diamide, maleuric acid, alkyl esters of maleuric acid and N-carbamyl maleimide, with at least one other monomer having a $>C=CH_2$ group, said interpolymer containing from about 2 percent to about 50 percent by weight of said amide and being characterized by having amido hydrogen atoms replaced by the structure:

$$-\underset{R}{CH}-OR_1$$

wherein R is a member of the class consisting of hydrogen, furyl and a saturated lower aliphatic hydrocarbon radical, and $R_1$ is a member selected from the class consisting of hydrogen atoms, alkyl radicals and benzyl radicals, and containing from about 1 to about 12 carbon atoms, with at least about 50 percent of said $R_1$ radicals being other than hydrogen atoms, said method comprising mixing the resinous composition with zinc chloride catalyst and heating the mixture to curing temperature, the temperature being in a range of about 260° F. to about 300° F.

12. A method of coating a surface of a solid body, which comprises applying thereto a mixture of zinc chloride and a heat hardenable, resinous composition comprising an interpolymer of an unsaturated amide selected from the class consisting of acrylamide, methacrylamide, itaconic diamide, maleuric acid, alkyl esters of maleuric acid and N-carbamyl maleimide, with at least one other monomer having a $>C=CH_2$ group, said interpolymer containing from about 2 percent to about 50 percent by weight of said amide and being characterized by having amido hydrogen atoms replaced by the structure:

$$-\underset{R}{CH}-OR_1$$

wherein R is a member selected from the class consisting of a hydrogen atom, a furyl radical and a saturated lower aliphatic hydrocarbon radical, and $R_1$ is a member of the class consisting of a hydrogen atom, an alkyl radical and a benzyl radical containing from about 1 to about 12 carbon atoms, with at least 50 percent of said $R_1$ radicals being other than —H, and heating the resultant film to a temperature in a range of about 260° F. to 300° F. until the resin is converted into a heat hardened, thermoset state.

References Cited by the Examiner
UNITED STATES PATENTS

| | | | |
|---|---|---|---|
| 2,839,506 | 6/1958 | Cooke et al. | 260—67.6 |
| 2,846,337 | 8/1958 | Cooke et al. | 260—71 |
| 2,940,945 | 6/1960 | Christenson et al. | 260—45.3 |
| 2,978,432 | 4/1961 | Graulich et al. | 260—72 |
| 2,978,437 | 4/1961 | Christenson | 260—72 |
| 3,060,061 | 10/1962 | Loebler et al. | 260—71 |

FOREIGN PATENTS 792,702  4/1948  Great Britain.

OTHER REFERENCES

Fieser et al.: "Organic Chemistry," D. C. Heath and Company, Boston, Mass., 1950, p. 573.

JOSEPH L. SCHOFER, *Primary Examiner.*

JOSEPH R. LIBERMAN, *Examiner.*

W. G. GOODSON, W. HOOVER, *Assistant Examiners.*